United States Patent
Pappa et al.

(10) Patent No.: US 11,265,790 B2
(45) Date of Patent: Mar. 1, 2022

(54) METHODS AND NETWORK ENTITIES FOR HANDOVER

(71) Applicant: Telefonaktiebolaget LM Ericsson (publ), Stockholm (SE)

(72) Inventors: Ioanna Pappa, Stockholm (SE); Elena Fersman, Stockholm (SE); Athanasios Karapantelakis, Stockholm (SE); Ricardo Souza, Indaiatuba (BR); Maxim Teslenko, Sollentuna (SE); Vlasios Tsiatsis, Solna (SE); Keven Wang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 16/475,808

(22) PCT Filed: Jan. 24, 2017

(86) PCT No.: PCT/EP2017/051381
§ 371 (c)(1),
(2) Date: Jul. 3, 2019

(87) PCT Pub. No.: WO2018/137755
PCT Pub. Date: Aug. 2, 2018

(65) Prior Publication Data
US 2021/0136647 A1  May 6, 2021

(51) Int. Cl.
*H04W 36/08* (2009.01)
*H04W 36/22* (2009.01)
(Continued)

(52) U.S. Cl.
CPC ....... *H04W 36/22* (2013.01); *H04W 36/0058* (2018.08); *H04W 36/0079* (2018.08);
(Continued)

(58) Field of Classification Search
CPC .............................. H04W 36/00; H04W 36/02
See application file for complete search history.

(56) References Cited

U.S. PATENT DOCUMENTS

2013/0329696 A1* 12/2013 Xu ...................... H04W 36/023
                                                          370/331
2014/0112307 A1*  4/2014 Kim .................. H04W 36/0061
                                                          370/331
(Continued)

FOREIGN PATENT DOCUMENTS

EP        1 130 938 A1    9/2001
EP        2874378 A1       5/2015
(Continued)

OTHER PUBLICATIONS

International Search Report and Written Opinion of the International Searching Authority, PCT/EP2017/051381, dated Oct. 11, 2017, 14 pages.
(Continued)

Primary Examiner — Michael T Vu
(74) Attorney, Agent, or Firm — Sage Patent Group

(57) ABSTRACT

A method performed by a serving network node for handover of a communication device to a target network node is provided. The method includes determining, based on content of an Information Centric Networking, ICN, request, a need for handover, and initiating, in response to the determining, a handover of the communication device to the target network node. A method performed by a network entity is also provided. A network node, network entity, computer programs and computer program products are also provided.

17 Claims, 10 Drawing Sheets

(51) Int. Cl.
*H04W 36/00* (2009.01)
*H04W 36/26* (2009.01)
*H04W 36/30* (2009.01)

(52) U.S. Cl.
CPC .......... *H04W 36/08* (2013.01); *H04W 36/26* (2013.01); *H04W 36/30* (2013.01)

(56) References Cited

U.S. PATENT DOCUMENTS

| | | | |
|---|---|---|---|
| 2014/0189060 A1* | 7/2014 | Westphal | H04L 67/327 709/217 |
| 2017/0214980 A1* | 7/2017 | Nadler | H04N 21/4312 |
| 2018/0227390 A1* | 8/2018 | Reznik | H04L 67/2842 |

FOREIGN PATENT DOCUMENTS

| WO | WO 2013/007208 A1 | 1/2013 |
|---|---|---|
| WO | WO 2016/199095 A1 | 12/2016 |

OTHER PUBLICATIONS

Communication Pursuant to Article 94(3) EPC for European Patent Application No. 17702038.5, dated Jul. 23, 2020, 6 pages.

* cited by examiner

METHODS AND NETWORK ENTITIES FOR HANDOVER

This application is a 35 U.S.C. § 371 national stage application of PCT International Application No. PCT/EP2017/051381 filed on Jan. 24, 2017, the disclosure and content of which is incorporated by reference herein in its entirety.

TECHNICAL FIELD

The technology disclosed herein relates generally to the field of wireless communications systems, and introduction of Information Centric Networking, ICN, in such wireless communications systems. In particular, methods for handover of communication devices, a network node, a network entity, computer programs and computer program products are provided.

BACKGROUND

Information Centric Networking (ICN) introduces an architecture that is information- or content-centric. In ICN, the routing of a request is performed based on a description of the content. This is in contrast to a host-centric networking model, wherein routing of a request is performed based on the host address (e.g. an IP address).

It may be foreseen that ICN entities will be installed on radio access nodes, such as e.g. evolved NodeBs (eNBs) and that these ICN entities should be in operation regardless of whether there are content producers and/or content consumers registered with them. In case of well-visited events, e.g. such as football matches, the number of user devices (e.g. user equipment, UEs), hosting the ICN content producers may be prohibitive for the capacity of an eNB serving the UEs with respect to a non-connectivity related functionality such as the ICN entity. Therefore the ICN producers may be allowed in the network with respect to connectivity but they may be denied access to layers higher than the connectivity layer.

This is a general problem not necessarily associated with ICN, when layers higher than connectivity layer functionality are allowed to operate on the eNB. That is, the radio capacity may be enough for the radio parts of a protocol (higher than Media Access Control/Physical layer, MAC/PHY) but the resources (e.g. processing resources or storage space) for such functionality may be limited. Scaling up, i.e. the ICN entity requesting more resources from the eNB is not always feasible since the ICN entity functionality may be of lower priority than the connectivity functionality. To implement joint admission control of radio and higher layer functionality may also encounter difficulties. At least for ICN type of applications, a UE hosting an ICN producer may be registered to the ICN entity but its future volumes of produced content may not be known at the time of registration. That is, admission control at the time of registration of the higher layer protocol endpoints may not solve the capacity problem.

Also the radio layer capacity may be an issue. For instance, if many UEs request content at the well-visited event, which content may include highly bandwidth-consuming content such as video and/or voice, there may also be lack of radio resources.

There is thus a need for ensuring capacity, e.g. in form of radio resources as well as processing and storage resources, when introducing ICN functionality in e.g. a wireless communications system.

SUMMARY

An objective of the present disclosure is to address and improve various aspects for introducing and handling Information Centric Network entities in e.g. a wireless communications system. A particular objective is to ensure sufficiency of resources for serving communication devices comprising ICN entities. Another particular objective is to ensure an efficient handling of communication devices comprising an ICN entity requesting certain content. These objectives and others are achieved by the methods, devices, computer programs and computer program products according to the appended independent claims, and by the embodiments according to the dependent claims.

The objective is according to an aspect achieved by a method performed by a serving network node for handover of a communication device to a target network node. The method comprises determining, based on content of an Information Centric Networking, ICN, request, a need for handover, and initiating, in response to the determining, a handover of the communication device to the target network node.

The method provides a number of advantages. The method may, for instance, be implemented in existing Long Term Evolution (LTE) cellular networks, which facilitate its deployment. The method may enhance the user experience by ensuring sufficient allocation of radio resources, i.e. interruption-free service, and by distributing serving of network capacity demand amongst available radio base stations in densely deployed cellular networks, e.g. in cities. A still further advantage is that an automatic load balancing is enabled for ICN content producers and thereby also resulting in an improved user experience.

The objective is according to an aspect achieved by a computer program for a network node. The computer program comprises computer program code, which, when run on processing circuitry of the network node causes the network node to perform the method as above.

The objective is according to an aspect achieved by a computer program product comprising a computer program as above and a computer readable means on which the computer program is stored.

The objective is according to an aspect achieved by a serving network node for handover of a communication device to a target network node. The network node is configured to determine, based on content of an information Centric Networking, ICN, request, a need for handover, and initiate, in response to the determining, a handover of the communication device to the target network node.

The objective is according to an aspect achieved by a method performed by a network entity for determining need for handover of a communication device from a serving network node to a target network node. The method comprises establishing that there is a lack of one or both of Information Centric Networking, ICN, content and resources in an ICN entity of the serving network node for providing ICN content requested by the communication device in an ICN request, and determining, in response to the establishing, a need for handover of the communication device to the target network node.

The objective is according to an aspect achieved by a computer program for a network entity. The computer program comprises computer program code, which, when run on processing circuitry of the network entity causes the network entity to perform the method as above.

The objective is according to an aspect achieved by a computer program product comprising a computer program as above and a computer readable means on which the computer program is stored.

The objective is according to an aspect achieved by a network entity for determining need for handover of a communication device from a serving network node to a target network node. The network entity is configured to: establish that there is a lack of one or both of Information Centric Networking, ICN, content and resources in an ICN entity of the serving network node for providing ICN content requested by the communication device in an ICN request, and determine, in response to the establishing, a need for handover of the communication device to the target network node.

Further features and advantages of the embodiments of the present teachings will become clear upon reading the following description and the accompanying drawings.

DETAILED DESCRIPTION

Figure 1:
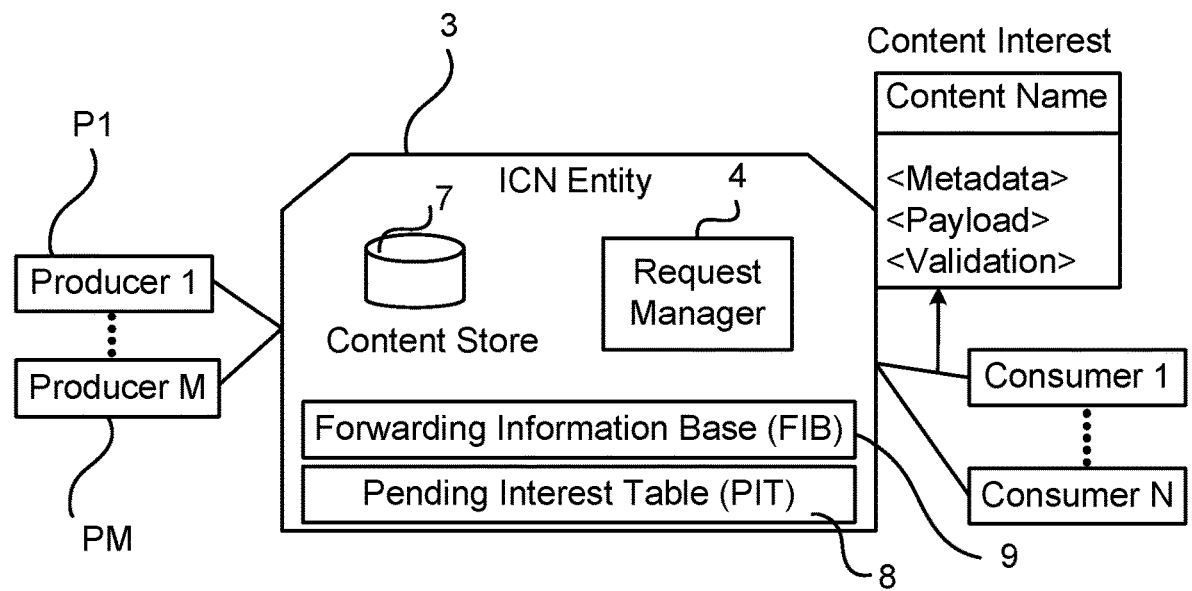
FIG. 1 illustrates an overview of an ICN architecture.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide thorough understanding of the present teachings, Information Centric Networking (ICN) is described initially in the following with reference to FIGS. 1, 2, 3 and 4.

FIG. 1 illustrates an overview of an ICN architecture, and in particular using the Content Centric Networking (CCN) approach to ICN. In a system, multiple consumers Consumer1, . . . , ConsumerN express their interest in certain pieces of content by sending interest requests to an ICN entity 3 e.g. an ICN router, ICN node or CCN node for the CCN approach. The interest requests comprise a content name, which may be an arbitrary series of bytes that may exhibit a naming structure, content metadata whose structure is currently undefined, eventual Payload and Validation parts. Producers P1, . . . , PM (which may also be denoted sources or publishers) may advertise the content they provide to the ICN entity 3, which pulls the content when it is actually requested by at least one consumer Consumer1, . . . , ConsumerN.

The main handler of all these requests is the Request Manager 4. It is noted that this is not an ICN term but used herein as a descriptive name for the main logic of the ICN entity 3. The ICN entity 3 also comprises a few databases and storages (described more in detail with reference to FIG. 3): a) a Pending Interest Table (PIT) 8 which maintains the interests coming from consumers, b) a Forwarding Information Base (FIB) 9 which maintains information about where to forward the consumer interests to eventually reach the desired producers of the desired content c) a Content Store (CS) 7 for cached content that passes by the ICN entity 3 in flight from a producer P1, . . . , PM to a consumer Consumer1, . . . , ConsumerN.

Multiple ICN entities 3 may be connected to each other and serve not only local producers and consumers which are directly associated to an ICN entity 3, but also remote producers and consumers associated with remote ICN entities.

Figure 2:
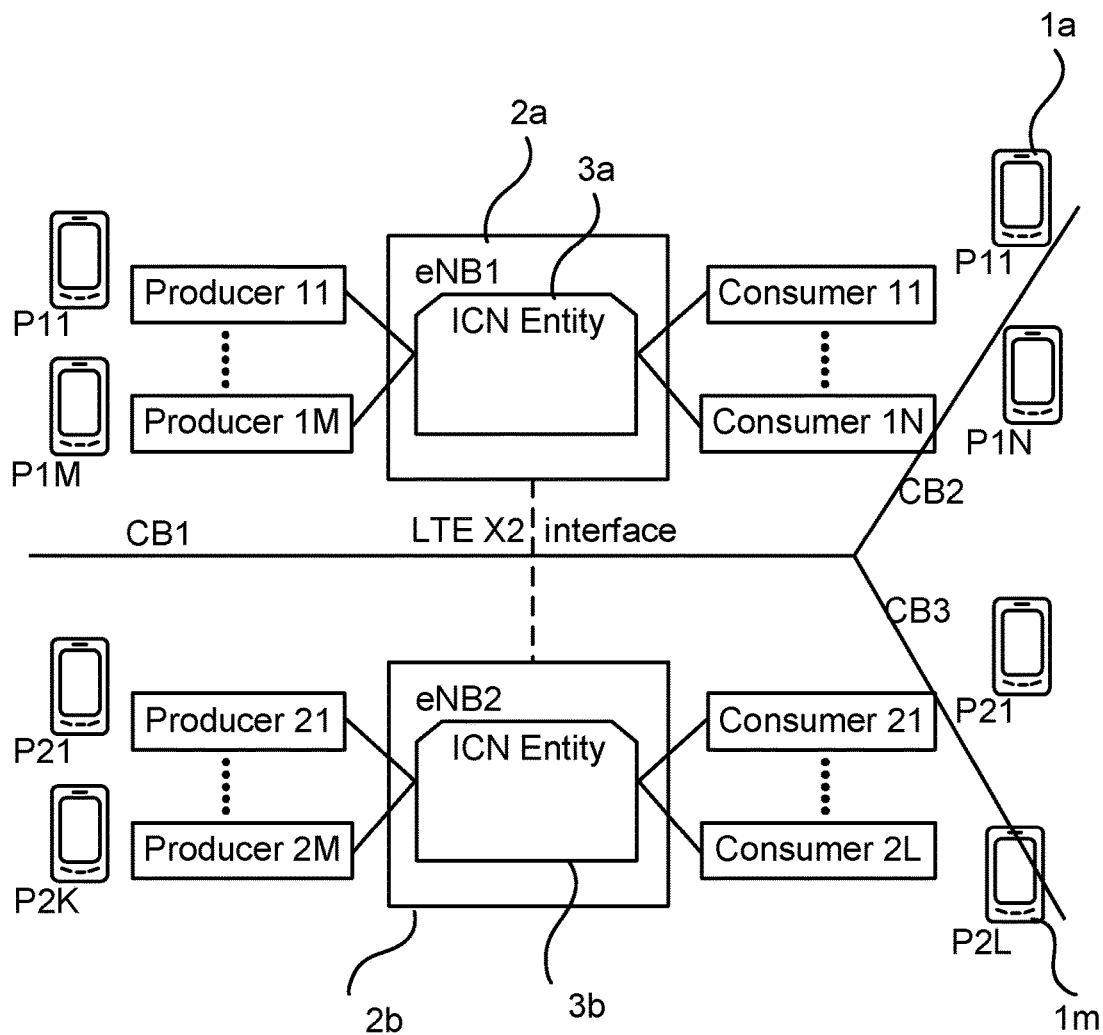
FIG. 2 illustrates an ICN entity hosted on a radio access node.

FIG. 2 illustrates an ICN entity hosted on a radio access node. The ICN entity 3a, 3b may be hosted on a radio access node, which serves a number of communication devices 1a, . . . , 1m. In FIG. 2, two ICN entities 3a, 3b are shown hosted on a respective radio access node, exemplified by eNB 2a, 2b. The communication devices 1a, . . . , 1m may be mobile clients such as User Equipment (UE). In the following, UEs are used as an example of a communication device, but it is noted that the present teachings are not restricted thereto. The radio access node may, for instance, be an eNB or a mobile network base station, each serving users in a respective cell(s). In the FIG. 2, cell boundaries CB1, CB2, CB3 between a few cells are shown. Each eNB has a coverage area that is defined by the cell, and the eNB provides service for users residing in the cell. The two illustrated eNBs 2a, 2b, each having a respective ICN entity 3a, 3b residing thereon, may be interconnected with an interface e.g. X2 in LTE for exchanging mainly management messages. One of the relevant messages for the present teachings is a HandOver request sent from one eNB to another.

The ICN entity 3a, 3b functionality resides mainly on top of the connectivity layers (PHY/MAC) and is a replacement of the Internet Protocol (IP) and higher layers. The ICN producers as well as the consumers are shown to be hosted on User Equipment (UE) such as smartphones. However, it is noted that e.g. the ICN producer may be a server of a cloud environment.

Hosting of ICN entity 3a, 3b in the eNB 2a, 2b enables to fully integrate resource management of ICN and radio bearers. In addition, when the ICN entity is an internal functional block in the eNB 2a, 2b, external protocols in the user planes and control planes may be avoided between the radio bearers and the ICN faces (an ICN face is a network interface where an ICN interest arrived from, described later). This will greatly simplify the implementation of ICN in RAN and provide the most efficient handling of radio for ICN. Also it will enable the usage of 3GPP constructs for security, authentication, etc.

As mentioned in the background section, if the ICN entity 3a, 3b is hosted on an eNB 2a, 2b there is a high probability that the resources, e.g. Central Processing Unit (CPU), memory, storage, for such functionality are limited as most of the resources of the eNB 2a, 2b would be allocated for serving the UEs 1a, . . . , 1m with respect to connectivity.

It is noted that the herein described CCN is just one example of an ICN, another example is Named Data Networking (NDN). The present teachings are applicable to all such ICNs. As indicated in the background section, instead of focusing on connecting communicating endpoints, as traditional networking protocols such as IP do, ICN focuses on the content object that should be retrieved. In ICN networking messages are routed based on the globally unique names of content objects rather than on endpoint addresses referring to physical boxes.

Figure 3:
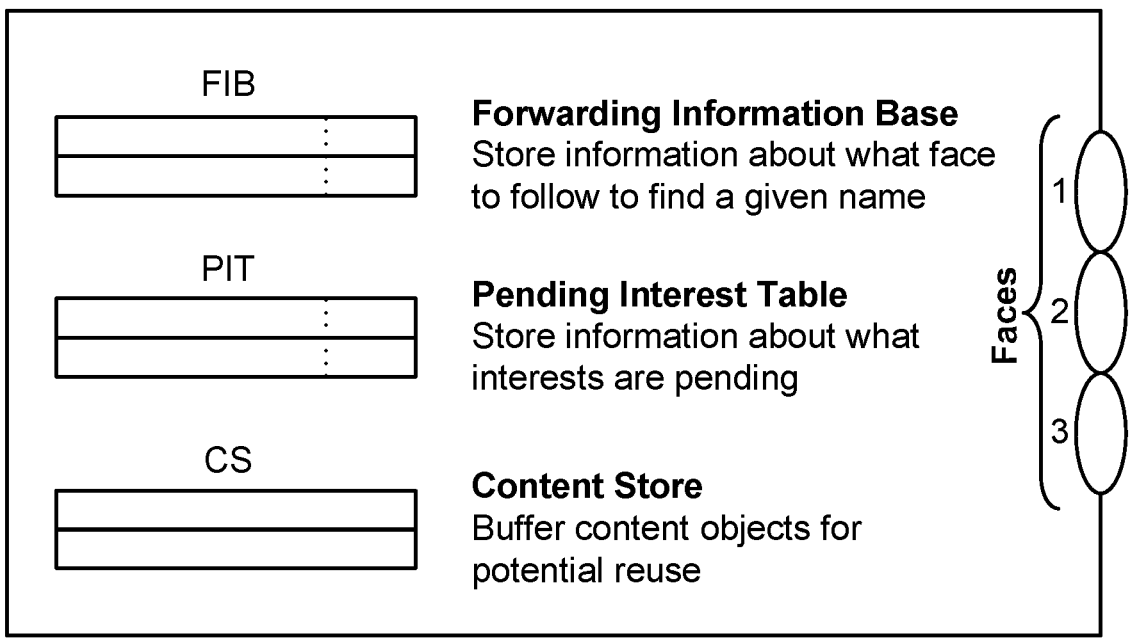
FIG. 3 illustrates a Content Centric Networking node

FIG. 3 illustrates a CCN node, which may, for instance, be router. In CCN a Content Object is retrieved by issuing, to the network, an Interest message containing the name of the Content Object. Such a message is routed by the network towards the source/publisher of the object. CCN nodes along the path check if they have a cached copy of the object. If so they will respond to the Interest message with a Data message containing the requested Content Object and the Interest message will not be propagated any further. The routing is helped by the name being a structured name similar to domain names, but with richer syntax. The CCN nodes (as all node, e.g. routers) maintain a Forwarding Information Base (FIB) about where, i.e. the interface or face (three such faces illustrated in FIG. 3), to forward which name or name prefix. The routers along the path of the Interest message keep a record of the Interest messages they have forwarded, i.e. the face where it came from and what Content Object it was naming, in their Pending Interest Table (PIT). If other Interest messages to the same name arrive to the router, it does not forward them, just notes them in the PIT beside the entry for this name. This is called Interest aggregation. In this way the PIT entries for the same name may form a tree in the network with receivers at the leaves.

When the Interest message reaches an endpoint (or router) having a copy of the Content Object (perhaps cached), the Interest message is responded to with a Data message, which is propagated backwards along the path the Interest message took. The backward path is learned from the entries the Interest message left in the PIT of the routers along the path. If there were multiple Interests arriving at a router for this name, the Data message containing the Content Object is replicated towards each respective face/direction, where the Interest messages came from. After forwarding a Content Object matching a pending Interest, the routers delete the corresponding entry in the PIT, thus these entries are expected to be short-lived. When the original endpoint(s) generating the Interest message(s) receive the Content Object the transaction is considered closed.

Figure 4:
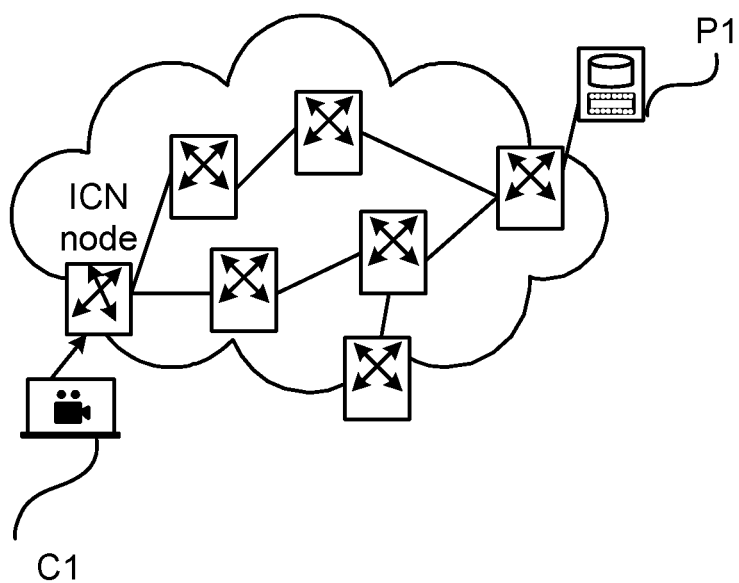
FIG. 4 illustrates nodes of an ICN system.

FIG. 4 illustrates nodes of an ICN system comprising a number of ICN nodes. A consumer Consumer1 may want to see a video and sends an Interest message, as described above, which is propagated in the ICN system until it reaches an ICN node having the requested content (video in this example). This ICN node responds with a Data message (comprising the video) to the ICN node from which it received the Interest message and the Content Object is provided to the consumer Consumer1 by the backwards propagation of the video to him.

As has been described, the ICN paradigm focuses on the actual information proposing a network architecture that is content or information-centric and performs routing of a request based on a description of content. In an aspect of the present teachings, filtering of ICN requests to one or more groups of UEs in a specific cell is used, the filtering being based on a description of the content that is requested. Instead of the conventional handover-trigger, i.e. the signal strength, a handover is triggered by the type of content that a UE request. The handover of one or more UEs to a cell is based on caching the requested type of content.

Figure 5:
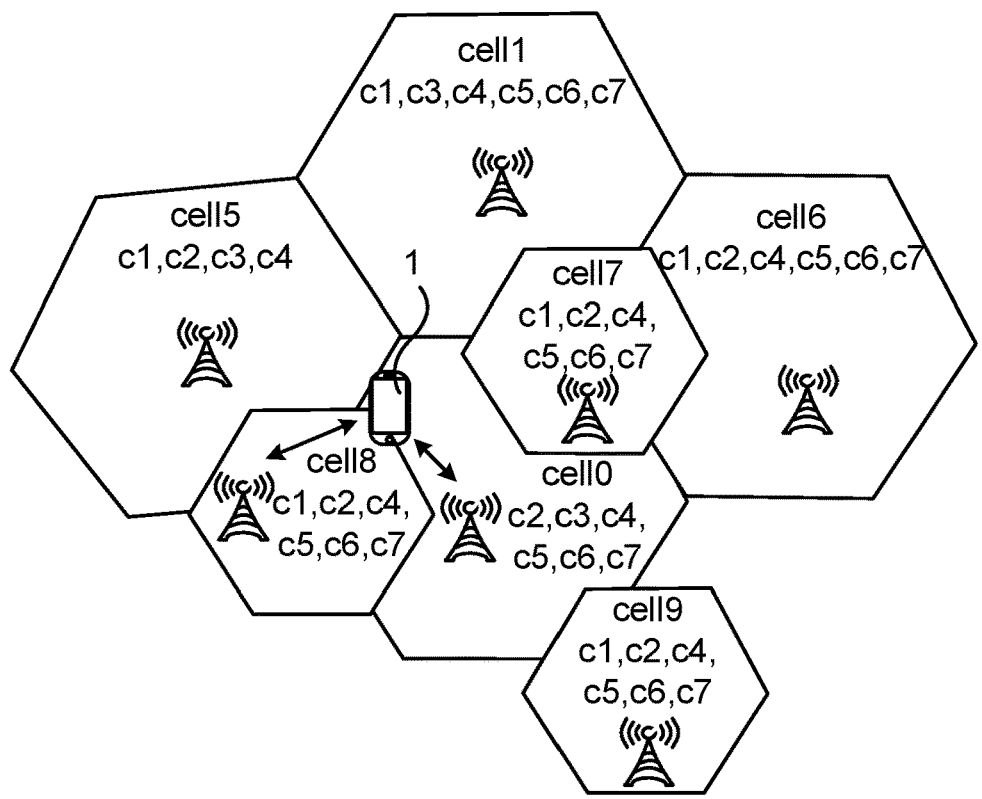
FIG. 5 illustrates handover for unicasting according to embodiments of the present teachings.

FIG. 5 illustrates handover for unicasting according to embodiments of the present teachings. In the unicast case, if the content c1 that the UE 1 requests is not in the current cell (cell0) of the UE 1 but in a neighbor cell (cell8), which also gives sufficient coverage for the UE 1, then instead of the current cell (cell0) also caching the content, the UE 1 can be handed over to the neighbor cell (cell8) to get the content.

In FIG. 5 it is illustrated that there is some content available in each cell. The content of each cell is indicated by content ID, e.g. cell1 has content with content ID "c1, c3, c4, c5, c6, c7". That is, the availability of certain content having a respective content ID is indicated for each cell (cell0, cell1, . . . , cell9). In the illustrated example, the UE 1 is currently at cell 0, which has content c2, c3, c4, c5, c6, c7. The UE 1 sends an ICN interest request for content c1, which is not available at cell0. However, neighboring cell, indicated as cell8, has c1 pre-cached. Therefore, when the node (e.g. an eNB) which has a coverage area defined by the cell cell0 receives the interest request, it decides to handover the UE 1 to cell8, in order for the UE 1 to retrieve the content.

Figure 6:
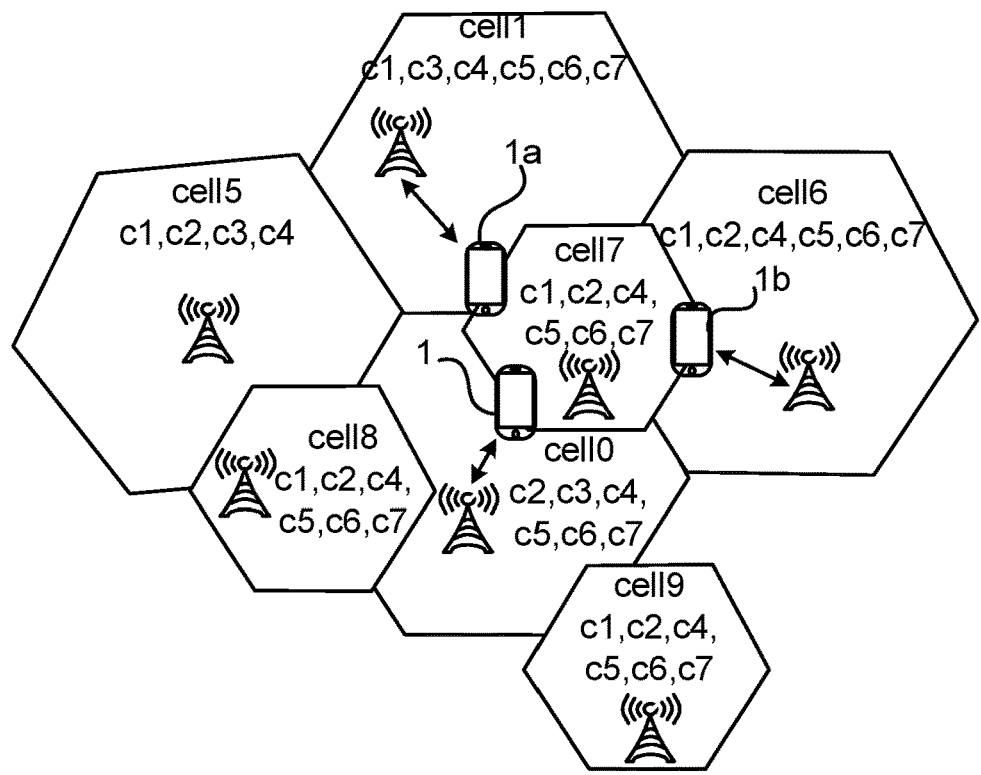
FIG. 6 illustrates handover for multicasting/broadcasting according to embodiments of the present teachings.

FIG. 6 illustrates handover for multicasting/broadcasting according to embodiments of the present teachings. In the multicast case, if several UEs 1, 1a, 1b request the same content or content of the same type, for example live streaming type of content such as a live broadcast of a football match, then instead of each individual cell caching the content to serve the UE in its current cell, the cells can hand over the UEs 1, 1a, 1b to a single cell where the UEs 1, a, b get sufficient coverage and thus only broadcast the content from that cell. This is exemplified in the following, in which cell cell7 is the single cell in which the broadcasting is made.

In FIG. 6 (as in FIG. 5), the content of each cell is indicated by content ID, e.g. cell1 has content with content ID "c1, c, c4, c5, c6, c7". That is, the availability of certain content having a respective content ID is indicated for each cell (cell0, cell1, . . . , cell9). There are three UEs 1a, 1b, 1 located in a respective cell; a first UE 1a in cell1, a second UE 1b in cell6 and a third UE 1 in cell0. The three UEs all request the same content c1. Hence, the one or more eNBs (not explicitly shown) providing service in the cells cell1, cell6 and cell0 can handover the three UEs 1a, 1b, 1 to cell7, although two of the cells, cell1 and cell6, already have the content pre-cached. In this way, every cell can spatiotemporally assume the role of a content provider of the same type of content. This can be more useful in situations where the range of a content-providing cell overlaps with the range of other cells. For instance, the content-providing cell may be a picocell, located within range of more traditional Radio Base Stations.

Figure 7:
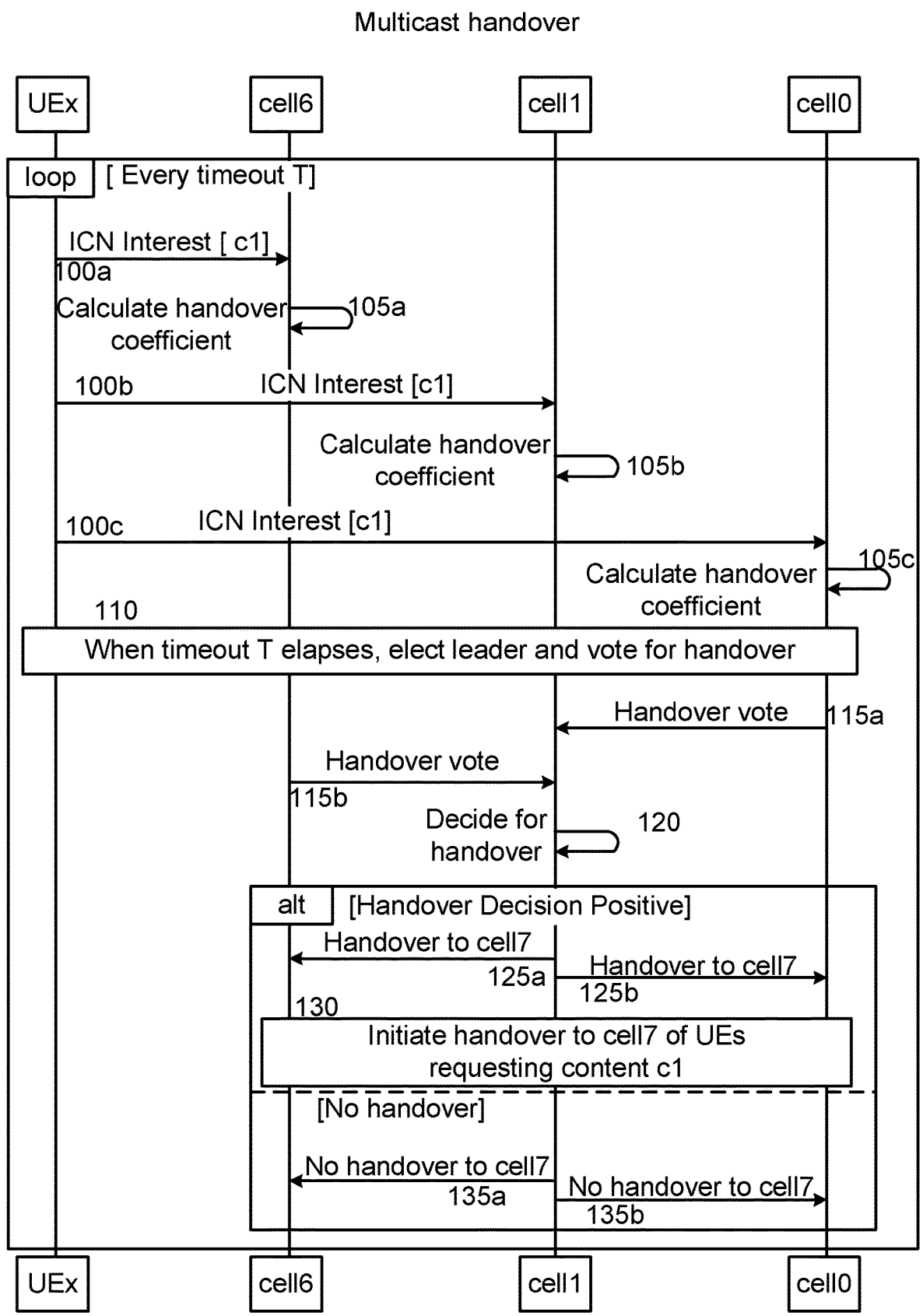
FIG. 7 is a sequence diagram illustrating handover for multicasting/broadcasting according to embodiments of the present teachings.

The decision for cell1, cell6 and cell0 to handover the UEs a, 1b, 1 to cell7 may, in various embodiments, be based on a voting algorithm. In the voting algorithm each affected cell casts a vote whether the UEs that request interest for a specific type of content served by cell7, should be handed over to cell7. If the majority of the votes are in favor, then all cells initiate handover to cell7. FIG. 7, described next, illustrates such handover process.

FIG. 7 is a sequence diagram illustrating handover for multicasting/broadcasting according to embodiments of the present teachings.

The process may be performed periodically, and may timeout every time period T. T is configurable and may be selected based e.g. on availability of idle processing capacity in the cells. For each cell (cell6, cell1, cell0 in the illustrated case) within that time period T, the content interest requests (arrows 100a, 100b, 100c) from the UEs (UEx) attached to it are logged and an updated handover coefficient (arrows 105a, 105b, 105c) for the requesting UEx and content type is calculated. The handover coefficient may be seen as a measure on likelihood for a handover. An exemplary formula for content c1 for cell i is given below:

$$h_i = \frac{\frac{s_{current}}{s_{maximum}} + hasnot(c1) + \frac{avg_{throughput}}{total_{throughput}}}{3}$$

wherein s denotes number of subscribers attached to the cell (current versus maximum supported), has-function denotes if cell already has or hasnot content c1 (0 if it has it, 1 if not). Finally, the ratio of average throughput consumption over latest period T versus total throughput capacity of the cell. The index $h_i$ is a normalized value from 0 to 1 where 1 indicates a greater likelihood to handover UEs requesting content c1 to a neighboring cell.

When timeout time period T elapses, a leader election and voting process begins (box 110), wherein a leader cell (cell1) is elected (e.g. based on well-known algorithms from distributed computing) and all other cells (cell6, cell0) cast a vote (arrows 115a, 115b) on whether to handover the UEx to the leader. The leader then chooses (arrow 120) to handover or not based on the results of the votes.

FIG. 7 also illustrates, in the sequence diagram at the lower right-hand side, the case when the handover decision (arrow 120) is positive, i.e. the UEs are handed over (arrows 125a, 125b) to cell7 which has the requested content c1, and the handover is initiated (box 130). This sequence diagram also shows the case when the handover decision (arrow 120) is negative, i.e. the handover decision (arrow 120) is that no handover is to be made (arrows 13a, 135b).

Figure 8:
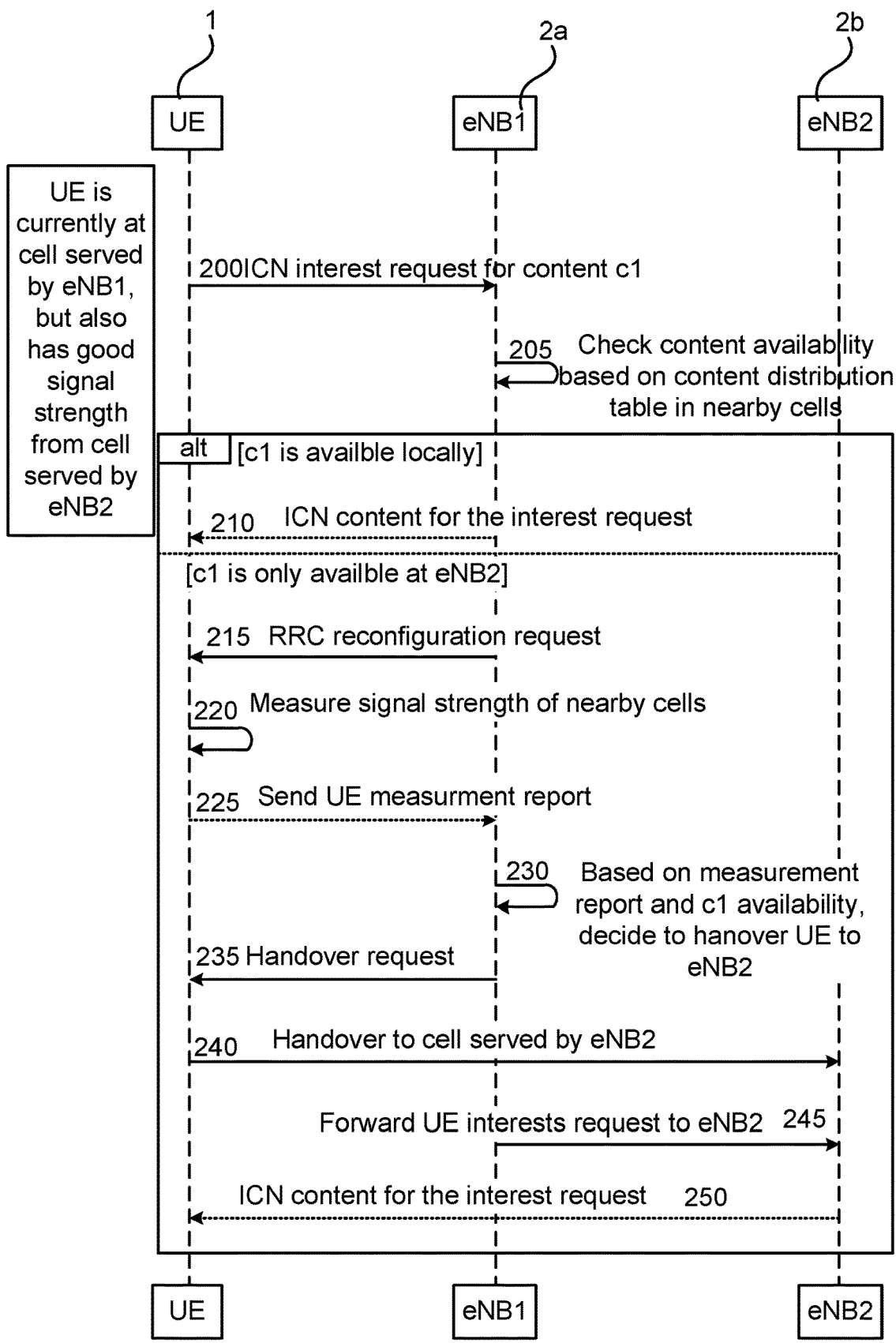
FIG. 8 illustrates network node triggered measurement reporting for handover according to embodiments of the present teachings.
Figure 9:
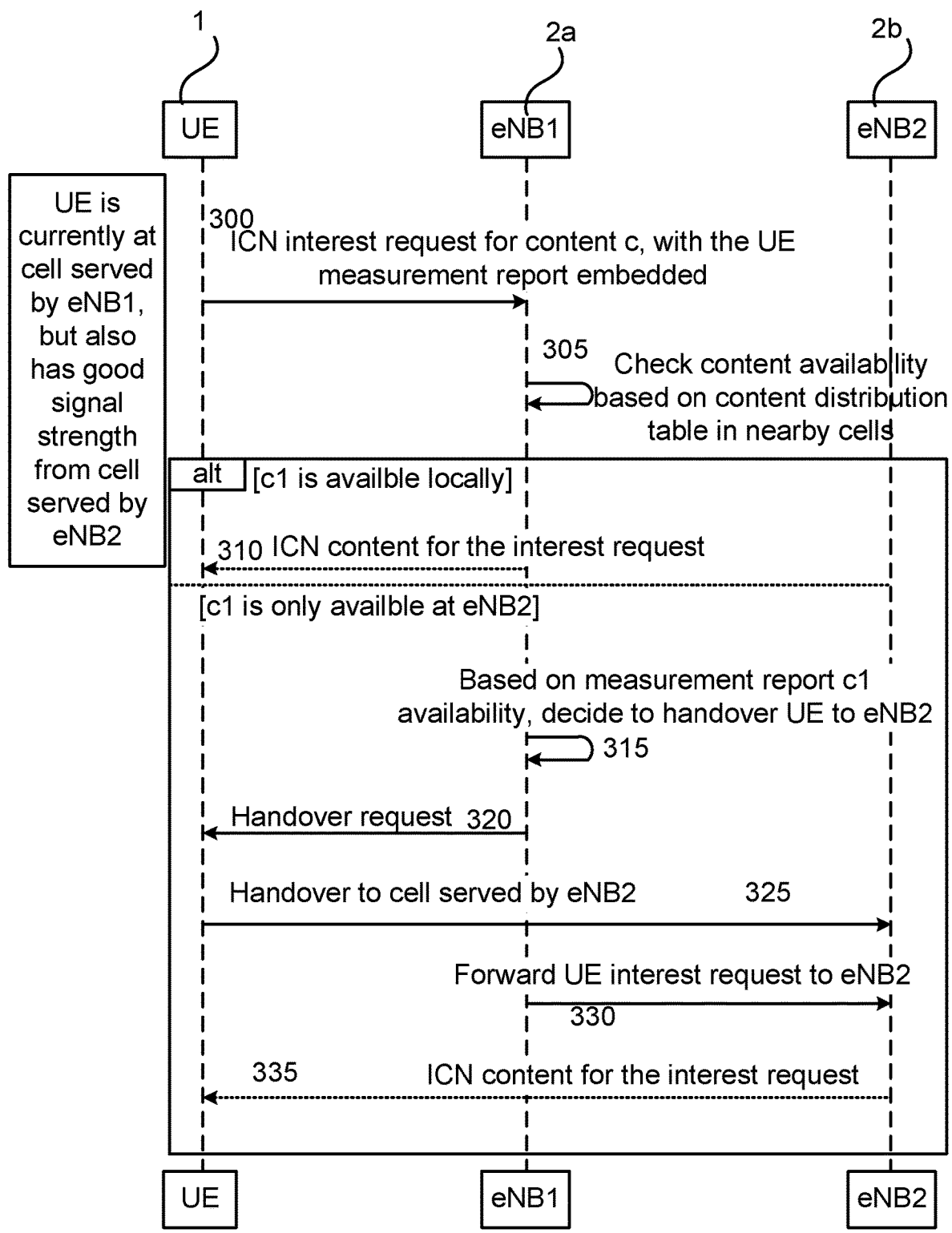
FIG. 9 illustrates communication device reporting for handover according to embodiments of the present teachings.

The sequence diagrams of FIGS. 8 and 9 show a handover mechanism based on the Radio Resource Control (RRC) protocol, which is standardized by 3GPP. In particular, they illustrate two different alternatives on how the current cell (also referred to as eNB), can retrieve UE measurement report, which contains information about the signal strength that the UE currently has, as well as the signal strength of neighboring cells in range of the UE's cellular radio transceiver. Based on the UE measurement report and where the content is actually cached, the eNB can either send the content back directly if content is cached locally, or handover UE to a neighbor cell which caches the content and also can provide sufficient coverage to the UE.

FIG. 8 illustrates network node triggered measurement reporting for handover according to embodiments of the present teachings. The UE 1 is initially residing in a first cell served by a first eNB1 2a. The UE 1 also receives signals having a good signal strength from a second cell served by a second eNB2 2b.

At arrow 200, the UE sends ICN interests to the first eNB1 2a (i.e. its serving eNB) asking for content c1.

At arrow 205, when the first eNB1 2a receives the interest request, it checks if this content is already cached locally (in an ICN entity 3a residing in the first eNB1 2a). If not, the first eNB1 2a checks if a neighbor cell has already cached this content, e.g. by using a content distribution table comprising available content in each neighboring cells.

At arrow 210, if the content is available in the currently serving eNB/cell, i.e., the first eNB1 2a just responds by providing the content to the UE 1.

If the requested content c1 is not cached in the currently serving first eNB1/cell, then the first eNB1 2a checks the neighbor cell content table and finds another cell, served by eNB2, that has already cached the content.

At arrow 215, the first eNB1 2a then sends an RRC reconfiguration request to the UE 1 for requesting a UE measurement report.

At arrow 220, the UE prepares UE measurement report, performs the requested signal strength measurements to nearby cells and sends (arrow 225) the measurement report to the first eNB1 2a.

At arrow 230, the first eNB1 2a decides if UE should do handover to the cell which has content pre-cached based on the UE measurement. That is, the first eNB1 2a uses the received UE measurement report and can check if the UE 1 will get sufficient coverage if handover to that cell which already has the content cached, i.e. to the second eNB2 2b. In the illustrated case, the first eNB1 2a decides that a handover is to be made to the cell served by the second eNB2 2b, so it sends (arrow 235) a handover request to the UE 1.

At arrow 240, the UE 1 is then handed over to a cell served by the second eNB2 2b.

At arrow 245, the first eNB1 2a may also forward the ICN interest request to the second eNB2 2b.

At arrow 250, the second eNB2 2b may then just respond to UE 1 with the already cached content (i.e. content c1 that the UE 1 requested).

FIG. 9 illustrates an alternative approach to the one described in FIG. 8. The difference in this alternative is that instead of the first eNB1 2a requests for UE measurement report after receiving ICN interest request, the UE 1 includes the UE measurement report in ICN interest request. In particular, arrows 300, 305 and 310 correspond to the actions described with reference to the arrows 200, 205 and 210, and the description is not repeated here.

At arrow 315, the first eNB1 2a has received the ICN interest request including the UE measurement report, and decides based thereon to handover the UE 1 to the second eNB2 2b.

At arrow 320 the first eNB1 2a thus sends a handover request to the UE 1.

At arrow 325, the UE is handed over to cell served by the second eNB2 2b.

At arrow 330, the first eNB1 2a forwards the UE interest request to the second eNB2 2b.

At arrow 335, the second eNB2 2b sends the ICN content c requested by the UE 1.

Both alternatives (FIG. 8 and FIG. 9) have their respective advantages; In embodiments described in relation to FIG. 8, the process is transparent to the UE 1, and the ICN entity (e.g. ICN software stack) can remain unchanged since everything is driven by eNBs following existing standardization. An advantage of embodiments described in relation to FIG. 9 is the reduced signaling between the UE 1 and eNBs 2a, 2b.

In the foregoing, content availability information in neighbor cells has been mentioned. In the following this is described and exemplified. In order for every cell (controlled by one or more eNBs) to inform other cells (or rather eNBs) of the content availability, the X2 protocol can be used, in conjunction to existing neighbor relation tables (NRTs). NRTs are standardized by 3GPP for LTE networks and onwards, and in various embodiments according to the present teachings, a content type field is added to the standardized NRT. In particular, the standardized NRT (e.g. automatic neighbor relation table) is amended such as to also include the content type field. For example, using the scenario of FIGS. 5 and 6 as example, the NRT for cell 7 would look like the below:

| NR | TCI | CI |
|---|---|---|
| 1 | Cell1 | c1, c3, c4, c5, c6, c7 |
| 2 | Cell0 | c2, c3, c4, c5, c6, c7 |
| 3 | Cell6 | c1, c2, c4, c5, c6, c7 |

The new NRT suggested herein thus comprises a target cell identifier (TCI) identifying a target cell and also the ICN content that each cell has cached (or rather that the respective eNB providing the cells has cached). For instance, a first cell with TCI cell1 has ICN content c1, c3, c4, c5, c6, c7 available, indicated in rightmost column, Content Information (CI). Since NRTs are available for each cell these embodiments are easy to deploy, i.e. simply adding the Content information.

In other embodiments, the content information CI is provided as a separate table.

Next, embodiments are described wherein handover may be based on availability of resources. The resource availability criterion may be used as a separate handover criterion or in addition to the content availability criterion that has been described. In these embodiments an elastic ICN platform on each eNB is combined with a joint admission control of radio and higher layer functionality. The admission control mechanism is responsible for checking if there are enough computational and storage resources on the eNB as well as communication resources and provides configuration for the elastic ICN platform to adjust itself on one eNB. If there are no higher-layer functionality resources (e.g. computational resources and/or storage for ICN functions) then the UEs hosting the higher-layer functionality (e.g. ICN) are instructed to hand over to another nearby eNB that has the necessary resources. In certain cases this may not be possible (e.g. if the UE only has access to one eNB), but in these cases the higher layer functionality may be denied eNB resources but still keep the communication resources.

Figure 10:
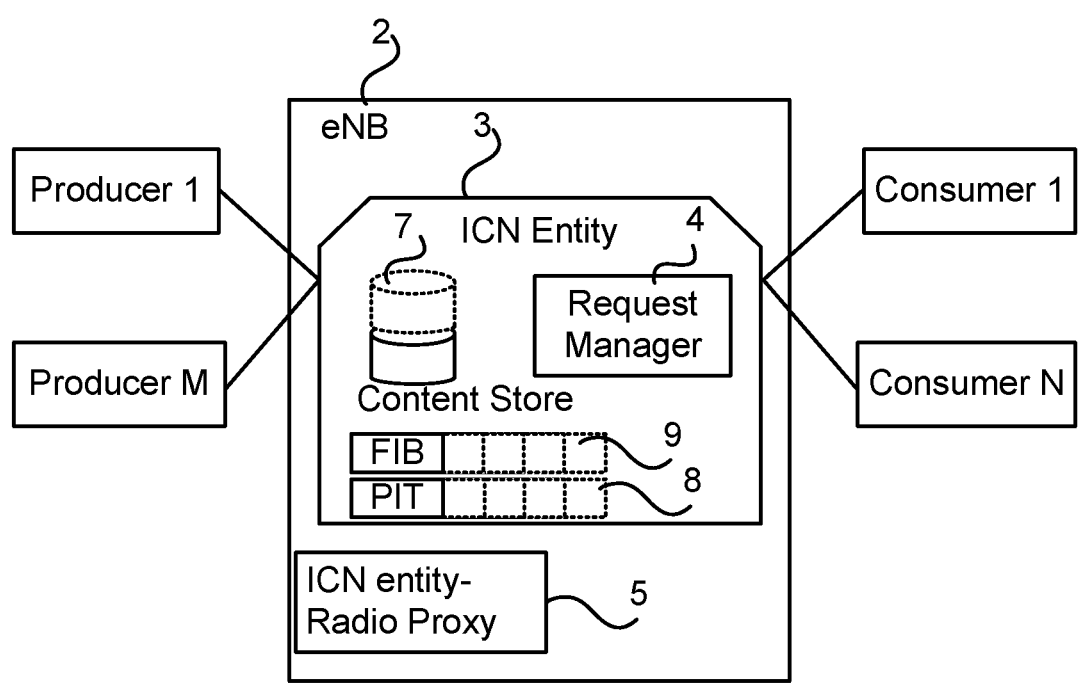
FIG. 10 illustrates an ICN entity for handling of resources according to embodiments of the present teachings.

FIG. 10 illustrates an ICN entity for handling of resources according to embodiments of the present teachings. In particular, FIG. 10 illustrates an elastic ICN entity for handling a varying level of (ICN) request loads and a network node on which the ICN entity 3 resides. The network node 2, in the figure exemplified by an eNB, is also arranged for radio event handling.

These embodiments enable a dynamic instantiation of the ICN entity 3 on the network node 2 and provide a network node (e.g. eNB 2) and a method for a current ICN entity 3 to initiate a single UE handover or group handover of several UEs. The ICN entity 3 functionality may be deployed in such a manner that it is elastic in terms of the different resources on one eNB and may trigger UE handover (i.e. a radio layer event) based on an ICN entity layer event. The ICN entity 3 may, for instance, determine that there is a need for handing over one or more UEs based on an ICN entity layer event. An example of such ICN entity layer event is shortage of resources.

The ICN entity 3 on the network node 2, in the following exemplified by an eNB 2, listens for ICN Interests and records the interests in a pending interest table (PIT) 8 and forwards interests to other ICN entities (not shown in FIG. 10) based on the information in the Forwarding Information Base (FIB) 9. The PIT 8 and FIB 9 and the content storage (CS) 7 of the ICN entity 3 should be designed to be elastic in the sense that they can grow up to a certain point. In FIG. 10, this elasticity is indicated by the dashed boxes in connection to the content storage 7, FIB 9 and PIT 8. After a certain point there may not be enough FIB, PIT and/or CS resources, and the ICN entity 3 needs to make the additional producers change the serving eNB to another one (i.e. determine that a handover is needed) where there are more resources (e.g. more PIT, FIB and CS resources) to serve them.

An ICN entity Radio Proxy 5 is provided, which receives events from the ICN entity Request Manager 4 and triggers radio handover for the UEs of the producers and corresponding consumers (i.e., the consumers which are looking for content produced by the producers to be handed over to a new eNB), as well as ICN entity state transfer between the ICN entity 3 in the existing eNB 2 and the new ICN entity in the eNB(s) that takes the responsibility of the handed over UEs.

The ICN entity 3 Radio Proxy 5 may, depending on the handover procedures, dispatch radio handover recommendations to an eNB for eNB-to-eNB handover or to a Mobility Management Entity (MME). UEs that host ICN producers may be directed to an ICN Entity in a core network. However, a joint resource management of the radio and ICN functionality may not always be feasible and a lot of traffic for locally produced and consumed content would have to go through the core network.

Figure 11:
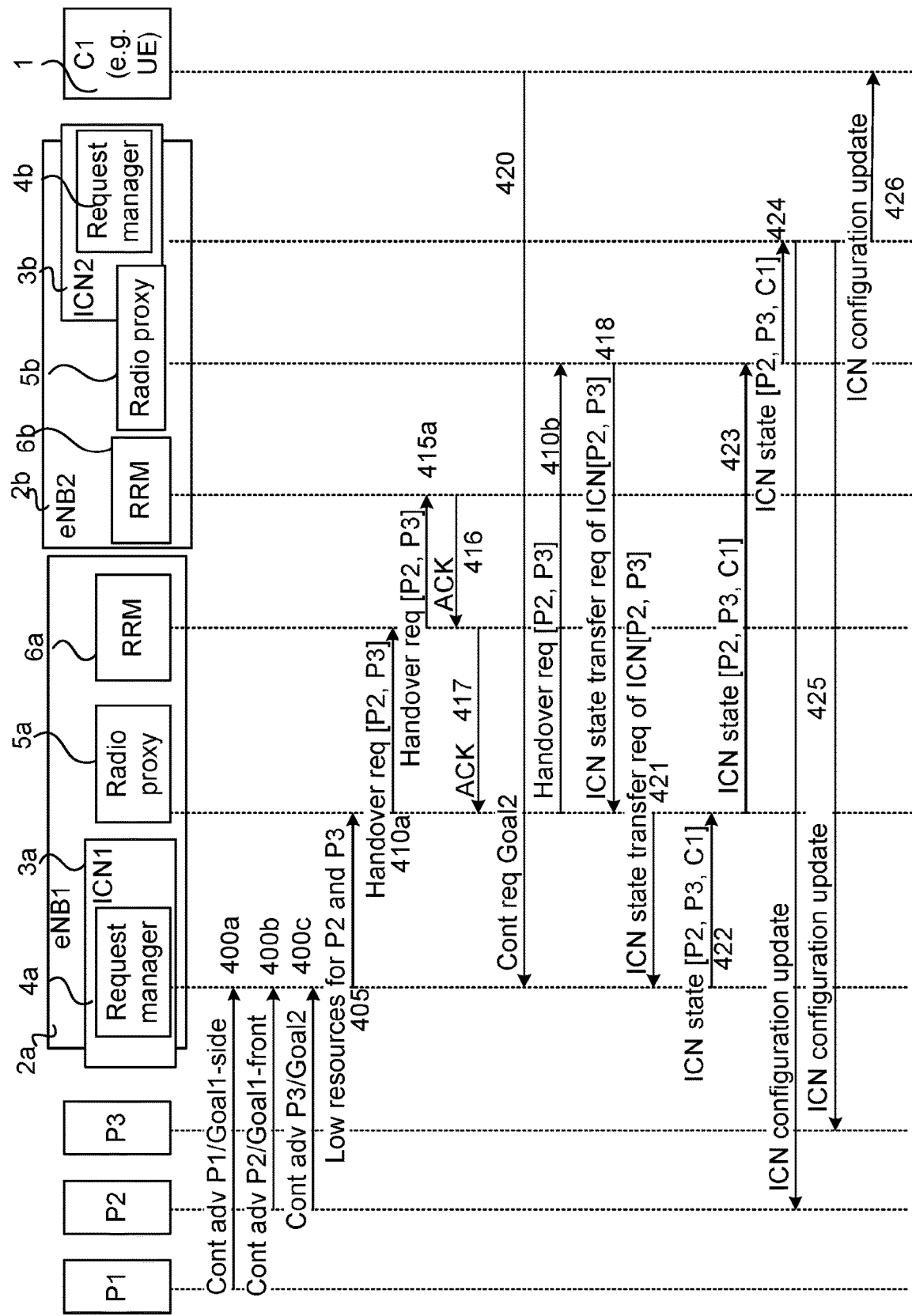
FIG. 11 is a sequence diagram illustrating handling of resources according to various embodiments of the present teachings.

FIG. 11 is a sequence diagram illustrating handling of resources according to various embodiments of the present teachings.

FIG. 11 illustrates a number of embodiments. A number of producers P1, P2 and P3 advertise (arrows 400a, 400b, 400c) video content. The video content may, for instance, comprise videos of two goals for a football match. At arrows 400a, 400b, 400c the producers P1, P2, P3 advertise this content. A first ICN entity 3a resides on a first eNB1 2a and comprises a request manager 4a.

At arrow 405, the request manager 4a uses some known advertisement metadata (e.g. content size) of the content advertisements sent by the producers P1, P2, P3 in order to determine that there are not enough resources on the first ICN entity 3a hosted on the first eNB1 2a. Such determination may, for instance, comprise using the content size provided in the advertisement metadata and an estimate based thereon whether or not the available storage capacity (e.g. content storage 7) will be sufficient to handle the request.

However, before an action is taken by the request manager 4a, a consumer C1 does manage (arrow 420) to express interest for the content of producer P3 (e.g. showing of a second goal, Goal 2, of a match). The request manager 4a sends (at arrow 405) information to a first Radio Proxy 5a informing that there are not enough resources for P2 and P3 on the first eNB1 2a. The first Radio Proxy 5a may also be part of the ICN entity 3a, or be a separate entity of the first eNB1 2a.

At arrows 410a, 410b the first radio proxy 5a then recommends a handover of the UEs hosting P2 and P3. The first radio proxy 5a notifies the Radio Resource Management (RRM) of the first eNB1 2a that the UEs hosting producers P2 and P3 would need to be handed over to a nearby eNB, e.g. to a second eNB2 2b. The RRM 6a of the first eNB1 2a can find out either by interrogating the UEs or an MME (these steps are omitted here) about nearby eNBs that would be suitable. Such suitability may be determined by the available resources (e.g. processing and/or storage resources) of nearby eNBs, and therefore any handover interrogation requests may comprise additional information about available higher-than-radio-functionality resources.

Assuming that producers P2 and P3 are both within reach of the second eNB2 2b, the RRM 6a of the first eNB1 2a initiates a handover of UEs associated with P2 and P3 to the second eNB2 2b. In particular, at arrow 415a the first RRM 6a of the first eNB1 2a sends, to a second RRM 6b of the second eNB 2b, a request for handover of UE(s) hosting producers P2, P3.

At arrow 416 the second RRM 6b of the second eNB 2b sends an acknowledgement (ACK) to the RRM 6a of the first eNB1 2a, which in turn sends (arrow 417) an acknowledgement of the handover to the first radio proxy 5a of the first eNB1 2a. After the RRM 6a of the first eNB1 2a has notified the radio proxy 5a of the first eNB1 2a about the handover request ACK (arrow 417), the ICN state transfer between the two ICN entity Request Managers 4a, 4b is initiated (arrows 418, 421, 422, 423, 424, 425, 426).

Since producers P2 and P3 will be handed over to a new eNB2, their PIT and FIB state might need to be transferred to the ICN entity 3b on the second eNB2 2b. It is noted that since the consumer C1 managed to install a state on the ICN entity 3a of the first eNB1 2a when the handover was in progress any state associated with the content of P3 and the interest of consumer C1 to P3's content would also need to be transferred. The producers P2, P3 and the consumer C1 are notified about this configuration update i.e., about the change of the ICN entity 3a, 3b that they were associated with.

The above thus provides a joint admission control function, wherein a joint radio functionality and higher-layer functionality admission control on the network node 2, 2a, 2b (e.g. eNB) or as a separate entity interconnected to the network node 2. This functionality ensures that the consumer, e.g. an UE 1, is granted access to the communication resources e.g. radio resources of high rate as well as higher-layer functionality (ICN) to store the produced content. A situation is thereby avoided, wherein the UE 1 is granted access to communication resources at high rate but there is a lack of ICN functionality resources, e.g. resources to store the produced content, resulting in that the requested service cannot be provided. The admission control provides a fall back solution in order to maintain the same user experience to the extent possible, i.e. initiate an automatic handover of UEs not based on signal strength but based on higher layer functionality resource requirements.

The various embodiments and features that have been described may be combined in many different ways, examples of which are given in the following.

Figure 12:
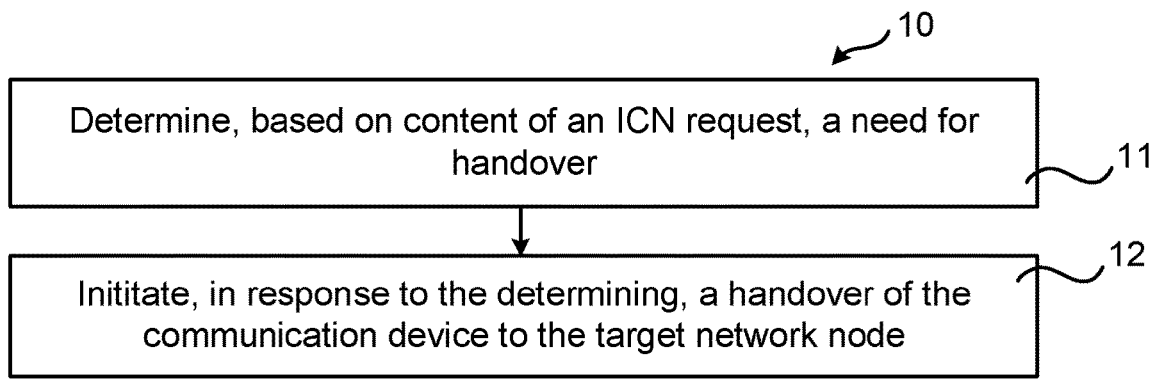
FIG. 12 illustrates a flow chart over steps of an embodiment of a method in a network node in accordance with the present teachings.

FIG. 12 illustrates a flow chart over steps of an embodiment of a method performed by a network node in accordance with the present teachings. The method 10 may be performed by a serving network node 2a for handover of a communication device 1a, 1b to a target network node 2b. It is noted that a network node may be the serving network node for some communication devices and a target network node for other communication devices, and that the method may hence be implemented in all network nodes of a communications system.

The method 10 comprises determining 11, based on content of an Information Centric Networking, ICN, request, a need for handover. As has been described, a handover may, for instance, be needed when the serving network node 2a has a shortage of resources for handling the ICN request (processing resources, storage resources and/or radio resources). The handover may also be needed when the network node 2a has not the content requested in the ICN request.

The method 10 comprises initiating 12, in response to the determining, a handover of the communication device 1a, 1b to the target network node 2b.

The method may enhance the user experience by ensuring sufficient allocation of radio resources, i.e. interruption-free service, and by distributing serving of network capacity demand amongst available radio base stations in densely deployed cellular networks, e.g. in cities. A still further advantage is that an automatic load balancing is enabled for ICN content producers, which also results in an improved user experience.

In an embodiment, the determining 11 comprises receiving, from an ICN entity 3a, an indication of lack of resources in the ICN entity 3a for providing the content requested in the ICN request.

In another embodiment, the determining 11 is performed by an ICN entity 3a in the serving network node 2, and comprises determining one or both of: an indication on lack of resources in the ICN entity 3a for providing the content of the ICN request and lack of resources in the serving network node 2a for providing the content requested in the ICN request.

The ICN entity 3a may, as indicated by the above two embodiments, either be a standalone device interconnected to the serving network node 2a, or it may be hosted on the serving network node 2a. The ICN request may, for instance, comprise an ICN Interest request or an advertisement request from content producers.

In various embodiments, the determining 11 comprises determining a lack of resources for providing the content requested from a content provider P1 based on metadata of the ICN request. The metadata may, for instance, comprise content size of the requested content, type of content, quality of content, etc.

In various embodiments, the lack of resources comprises one or more of: lack of storage capacity in an ICN entity 3a of the serving network node 2a, lack of resources in a pending interest table, PIT, 8 in an ICN entity 3a of the serving network node 2a, lack of resources in a Forwarding Information Base, FIB, 9 in an ICN entity 3a of the serving network node 2a, lack of processing capacity in the serving network node 2a for handling the ICN request, lack of storage capacity in the serving network node 2a for handling the ICN request.

In various embodiments, the method 10 comprises receiving the ICN request from the communication device 1 and wherein the determining 11 comprises determining lack of availability of content requested in the ICN request.

In a variation of the above embodiment, the method 10 comprises determining that the target network node 2b has the requested content cached, and initiating 12 in response thereto handover of the communication devices 1, 1a, 1b to the target network node 2b. That is, if the currently serving network node 2a does not have the content that a communication device 1, 1a, 1b requests, it can hand over it to a target network node 2b that has the content cached, instead of retrieving the requested content.

In a variation of the above embodiment, the determining 11 is performed by an ICN entity 3a in the serving network node 2, and comprises determining the lack of availability of the requested content in a content storage 7.

In various embodiments, the determining 11 comprises determining a need for handover of two or more communication devices 1, 1b requesting the same content in respective ICN requests and determining that the target network node 2b has the requested content cached, and initiating 12 in response thereto handover of the two or more communication devices 1, 1b to the target network node 2b.

In a variation of the above embodiment, the initiating 12 comprises performing a voting process involving at least the serving network node 2a and the target network node 2b, the voting process determining whether or not to hand over communication devices that request the ICN content and reside in a coverage area of the serving network node 2a, to the target network node 2b.

In various embodiments, the method 10 comprises performing a voting process (e.g. as described earlier) involving the serving network node 2a and at least a second network node 2b. Both network nodes 2a, 2b provide a requested content to one or more communication devices 1, 1a, 1b. The method 10 further comprises, for the case that the voting process determines that the serving network node 2a is to serve the one or more communication devices 1, 1a, 1b, multicasting or broadcasting the requested content to the one or more communication devices 1, 1a, 1b. For instance, if the two or more devices, currently being served by multiple (at least two) network nodes, request the same content (e.g. live content), then these network nodes can determine (by means of the voting process) that a single network node which has good propagation to all these devices is to serve all the devices. A handover may then be made of all devices to the selected network node. The network node selected to serve all the devices that request the same content may then use a more efficient way to transmit the content (e.g. live content), by, for example, switching to multicast or broadcast.

In various embodiments, the method 10 comprises receiving, from the communication device 1a, 1b, a measurement report on signal strength from the target network node 2b, the measurement report being received appended to the ICN request.

Figure 13:
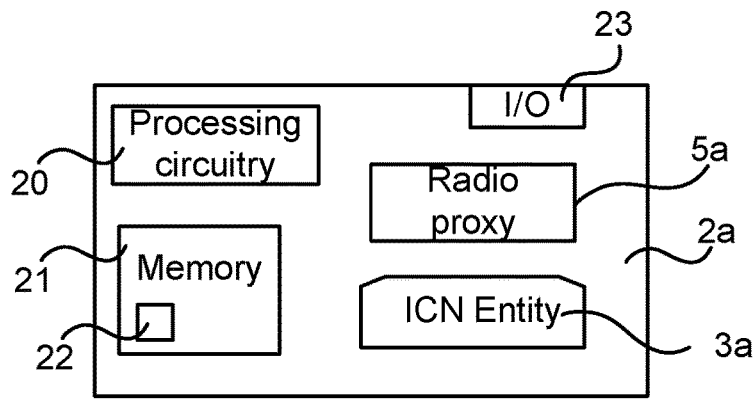
FIG. 13 illustrates schematically a network node and means for implementing embodiments of the method in accordance with the present teachings.

FIG. 13 illustrates schematically a network node and means for implementing embodiments of the method in accordance with the present teachings. The network node 2a may be a serving network node 2a.

The serving network node 2a comprises processing circuitry 20 which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the network node 2a to perform a set of operations, or steps, e.g. as described in relation to FIGS. 7, 8, 9, 11 and 12. For example, the storage medium 21 may store the set of operations, and the processing circuitry 20 may be configured to retrieve the set of operations from the storage medium 21 to cause the network node 2a to perform the set of operations. The set of operations may be provided as a set of executable instructions. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The network node 2a may further comprise an interface 23 for communications with e.g. other network nodes 2b (e.g. an interface for a wired connection) and communication devices 1, 1a, 1b (e.g. an interface for a wireless connection). The communications interface 23 may thus comprise one or more input/output devices and/or a protocol stack for communication with other devices or entities. The interface 23 may be used for receiving data input and for outputting data.

The network node 2a may also comprise the radio proxy 5a and/or the ICN entity, which have both been described earlier.

A serving network node 2a is provided for handover of a communication device 1a, 1b to a target network node 2b. The network node 2a is configured to:
determine, based on content of an information Centric Networking, ICN, request, a need for handover, and
initiate, in response to the determining, a handover of the communication device 1a, 1b to the target network node 2b.

The serving network node 2a may be configured to perform the above steps e.g. by comprising one or more processors 20 (or processing circuitry) and memory 21, the memory 21 containing instructions executable by the processor 20, whereby the serving network node 2a is operative to perform the steps. That is, in an embodiment, a serving network node 2a is provided for handover of a communication device. The serving network node 2a comprises one or more processors 20 and memory 21, the memory 21 containing instructions executable by the processor 20, whereby the serving network node 2a is operative to determine, based on content of an Information Centric Networking, ICN, request, a need for handover, and to initiate, in response to the determining, a handover of the communication device 1a, 1b to the target network node 2b.

In an embodiment, the serving network node 2a is configured to receive, from an ICN entity 3a, an indication of lack of resources in the ICN entity 3a for providing the content requested in the ICN request.

In various embodiments, the serving network node 2a is configured to determine one or both of: an indication on lack of resources in the ICN entity 3a for providing the content of the ICN request and lack of resources in the serving network node 2a for providing the content requested in the ICN request.

In various embodiments, the serving network node 2a is configured to determine a lack of resources for providing the content requested from a content provider P1 based on metadata of the ICN request.

In various embodiments, the lack of resources comprises one or more of: lack of storage capacity in an ICN entity 3a of the serving network node 2a, lack of resources in a pending interest table, PIT, 8 in an ICN entity 3a of the serving network node 2a, lack of resources in a Forwarding Information Base, FIB, 9 in an ICN entity 3a of the serving network node 2a, lack of processing capacity in the serving network node 2a for handling the ICN request, lack of storage capacity in the serving network node 2a for handling the ICN request.

In various embodiments, the serving network node 2a is configured to receive the ICN request from the communication device 1 and to determine lack of availability of content requested in the ICN request.

In a variation of the above embodiment, the serving network node 2a is configured to determine that the target network node 2b has the requested content cached, and initiate in response thereto handover of the communication devices 1, 1a, 1b to the target network node 2b.

In a variation of the above embodiments, the serving network node 2a is configured to determine the lack of availability of the requested content in a content storage 7.

In various embodiments, the serving network node 2a is configured to determine a need for handover of two or more communication devices 1, 1a, 1b requesting the same content in respective ICN requests and to determine that the target network node 2b has the requested content cached, and to initiate in response thereto handover of the two or more communication devices 1, 1b to the target network node 2b.

In a variation of the above embodiment, the serving network node 2a is configured to determine by performing a voting process involving at least the serving network node 2a and the target network node 2b, the voting process determining whether or not to hand over communication devices that request the ICN content and reside in a coverage area of the serving network node 2a, to the target network node 2b.

In various embodiments, the serving network node 2a is configured to perform a voting process involving the serving network node 2a and at least a second network node 2b, both of which provide a requested content to one or more communication devices 1, 1a, 1b, and comprising, for the case that the voting process determines that the serving network node 2a is to serve the one or more communication devices 1, 1a, 1b, multicasting or broadcasting the requested content to the one or more communication devices 1, 1a, 1b.

In various embodiments, the serving network node 2a is configured to receive, from the communication device 1, 1a, 1b, a measurement report on signal strength from the target network node 2b, the measurement report being received appended to the ICN request.

Figure 14:
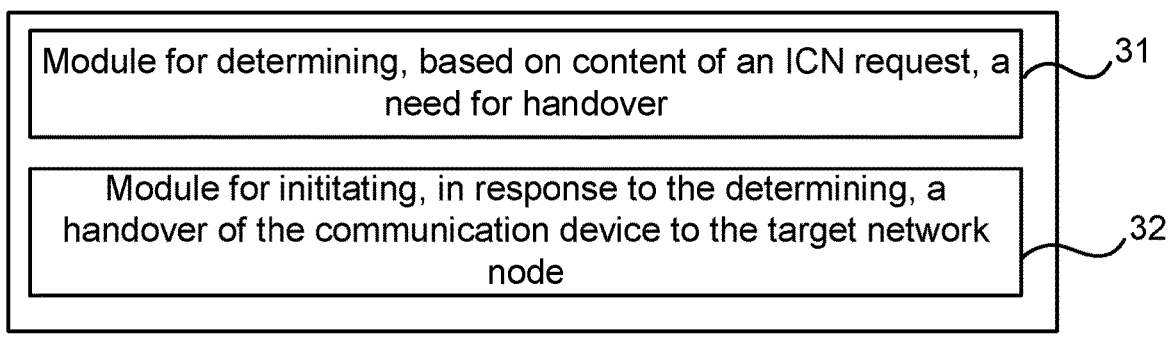
FIG. 14 illustrates a network node comprising function modules/software modules for implementing embodiments of the present teachings.

FIG. 14 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A serving network node is provided for handover of a communication device to a target network node.

The serving network node comprises a first module 31 for determining, based on content of an Information Centric Networking, ICN, request, a need for handover.

Such first module 31 may, for instance, comprise processing circuitry adapted to perform such determination.

The serving network node comprises a second module 32 for initiating, in response to the determining, a handover of the communication device to the target network node. Such second module 32 may, for instance, comprise processing circuitry adapted to initiate handover, e.g. in response to receiving a signal from the first module 31.

It is noted that one or both of the modules 31, 32 may be replaced by units.

Figure 15:
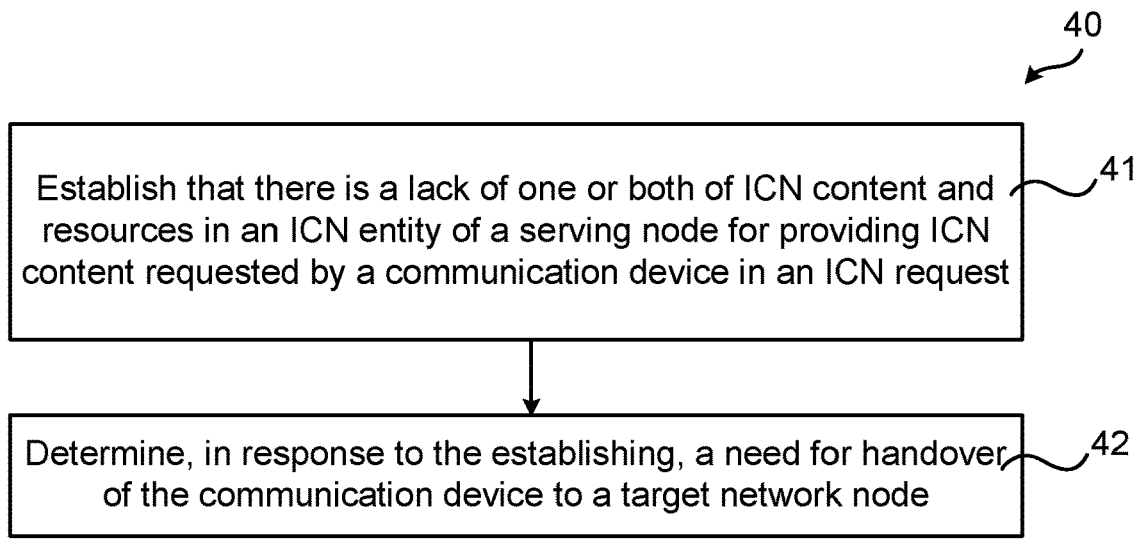
FIG. 15 illustrates a flow chart over steps of an embodiment of a method in a network entity in accordance with the present teachings.

FIG. 15 illustrates a flow chart over steps of an embodiment of a method in a network entity in accordance with the present teachings. The method 40 may be performed by a network entity 5a for determining a need for handover of a communication device 1a, 1b from a serving network node 2a to a target network node 2b. The network entity 5a may, for instance, be the radio proxy entity 5a as has been described herein, e.g. in relation to FIG. 10.

The method 40 comprises establishing 41 that there is a lack of one or both of Information Centric Networking, ICN, content and resources in an ICN entity 3a of the serving network node 2a for providing ICN content requested by the communication device 1a, 1b in an ICN request.

The method 40 comprises determining 42, in response to the establishing, a need for handover of the communication device 1a, 1b to the target network node 2b.

The network entity 5a may be seen as an admission control function in e.g. an eNB, which function establishes that there is insufficient resources for providing the content requested in an ICN request, and in response thereto initiates a handover of one or more communication devices.

In an embodiment, the method 40 comprises, in response to the determining 42, providing a handover initiation request to a radio resource management 6a of the serving network node 2a.

In various embodiments, the establishing 41 comprises receiving, from the ICN entity 3a of the serving network node 2a, an indication on lack of resources in the ICN entity 3a for providing the content of the ICN request.

In variations of the above embodiment, the lack of resources comprises one or more of: lack of storage capacity in the ICN entity 3a of the serving network node 2a, lack of resources in a pending interest table, PIT, 8 in an ICN entity 3a of the serving network node 2a, lack of resources in a Forwarding Information Base, FIB, 9 in an ICN entity 3a of the serving network node 2a, lack of processing capacity in the serving network node 2a for handling the ICN request, lack of storage capacity in the serving network node 2a for handling the ICN request.

In various embodiments, the establishing 41 comprises receiving, from an ICN entity 3a of the serving network node 2a, an indication of lack of availability to the content requested by the communication device 1, 1a, 1b.

Figure 16:
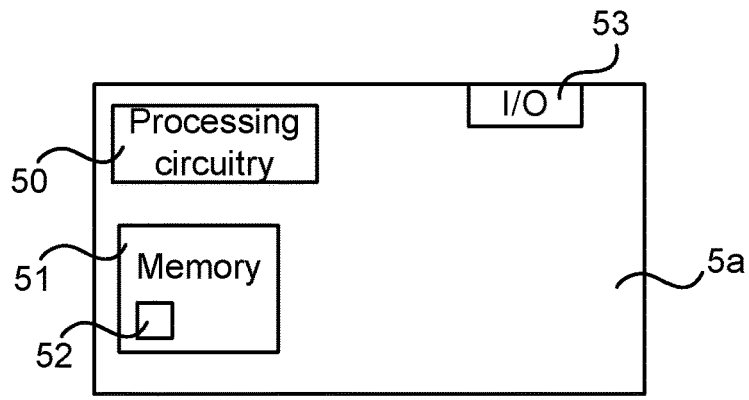
FIG. 16 illustrates schematically a network entity and means for implementing embodiments of the method in accordance with the present teachings.

FIG. 16 illustrates a network entity and means for implementing embodiments of the method in accordance with the present teachings.

The network entity 5a comprises processing circuitry 50 which may be any combination of one or more of a suitable central processing unit (CPU), multiprocessor, microcontroller, digital signal processor (DSP), etc., capable of executing software instructions stored in a computer program product 51, e.g. in the form of a storage medium 51.

The processing circuitry 50 may further be provided as at least one application specific integrated circuit (ASIC), or field programmable gate array (FPGA).

The processing circuitry 50 is configured to cause the network entity 5a to perform a set of operations, or steps, e.g. as described in relation to FIGS. 7, 8, 9, 11 and 15. For example, the storage medium 51 may store the set of operations, and the processing circuitry 50 may be configured to retrieve the set of operations from the storage medium 51 to cause the network entity 5a to perform the set of operations. The set of operations may be provided as a set of executable instructions. The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

The network entity 5a may further comprise an interface 53 for communications with e.g. network nodes 2b. The communications interface 53 may comprise one or more input/output devices or a protocol stack for communication with other devices or entities. The interface 53 may be used for receiving data input and for outputting data. The network entity 5a may, for instance, be a radio proxy 5a as has been described herein, e.g. in relation to FIG. 10.

A network entity 5a is provided for determining need for handover of a communication device 1, 1a, 1b from a serving network node 2a to a target network node 2b. The network entity 5a is configured to:
  establish that there is a lack of one or both of Information Centric Networking, ICN, content and resources in an ICN entity 3a of the serving network node 2a for providing ICN content requested by the communication device 1, 1a, 1b in an ICN request, and
  determine, in response to the establishing, a need for handover of the communication device 1, 1a, 1b to the target network node 2b.

The network entity 5a may be configured to perform the above steps e.g. by comprising one or more processors 50 (or processing circuitry) and memory 51, the memory 51 containing instructions executable by the processor 50, whereby the network entity 5a is operative to perform the steps. That is, in an embodiment, a network entity is provided for determining need for a handover of a communication device. The network entity 5a comprises one or more processors 50 and memory 51, the memory 51 containing instructions executable by the processor 50, whereby the network entity 5a is operative to establish that there is a lack of one or both of Information Centric Networking, ICN, content and resources in an ICN entity of the serving network node for providing ICN content requested by the communication device in an ICN request, and to determine, in response to the establishing, a need for handover of the communication device to the target network node.

In an embodiment, the network entity 5a is configured to provide, in response to the determining, a handover initiation request to a radio resource management 6a of the serving network node 2a.

In an embodiment, the network entity 5a is configured to establish by receiving, from the ICN entity 3a of the serving network node 2a, an indication on lack of resources in the ICN entity 3a for providing the content of the ICN request.

In various embodiments, the lack of resources comprises one or more of: lack of storage capacity in the ICN entity 3a of the serving network node 2a, lack of resources in a pending interest table, PIT, 8 in an ICN entity 3a of the serving network node 2a, lack of resources in a Forwarding Information Base, FIB, 9 in an ICN entity 3a of the serving network node 2a, lack of processing capacity in the serving network node 2a for handling the ICN request, lack of storage capacity in the serving network node 2a for handling the ICN request.

In an embodiment, the network entity 5a is configured to establish by receiving, from the ICN entity 3a of the serving network node 2a, an indication of lack of availability to the content requested by the communication device 1, 1a, 1b.

Figure 17:
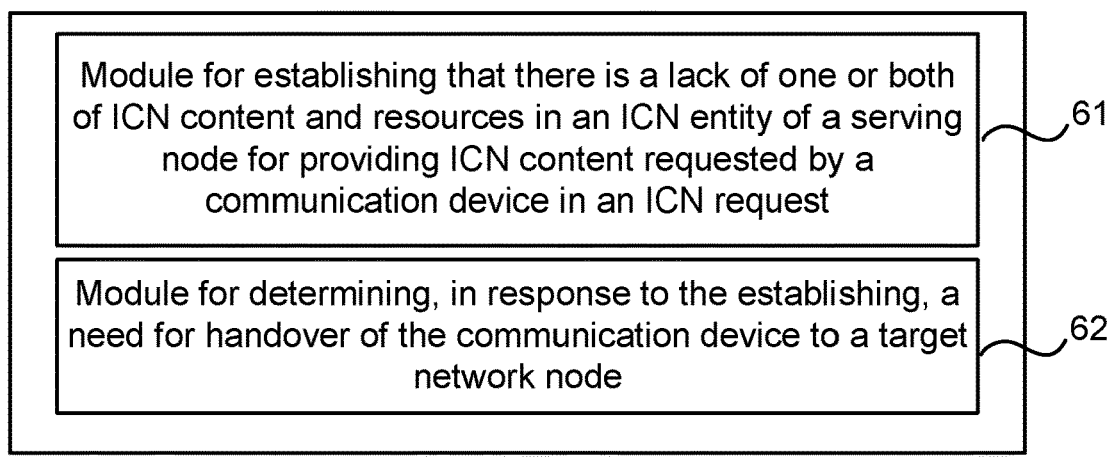
FIG. 17 illustrates a network entity comprising function modules/software modules for implementing embodiments of the present teachings.

FIG. 17 illustrates a network entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A network entity is provided for determining need for a handover of a communication device from a serving network node to a target network node.

The network entity comprises a first module 61 for establishing that there is a lack of one or both of Information Centric Networking, ICN, content and resources in an ICN entity of the serving network node for providing ICN content requested by the communication device in an ICN request. Such first module 61 may, for instance, comprise processing circuitry adapted to perform such establishing.

The network entity comprises a second module 62 determining, in response to the establishing, a need for handover of the communication device to the target network node. Such second module 62 may, for instance, comprise processing circuitry adapted for such determination, e.g. in response to receiving a signal from the first module 31.

It is noted that one or both of the modules 61, 62 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed by a serving network node for handover of a communication device to a target network node, the method comprising:
  determining, based on content of an Information Centric Networking, ICN, request, a need for handover,
  initiating, in response to the determining, a handover of the communication device to the target network node,
  receiving the ICN request from the communication device, and
  wherein the determining comprises determining a lack of resources in the serving network node for providing the content requested in the ICN request, wherein the lack of resources comprises at least one of, lack of storage capacity in an ICN entity of the serving network node, lack of resources in a pending interest table (PIT) in an ICN entity of the serving network node, lack of resources in a Forwarding Information Base (FIB) in an ICN entity of the serving network node, lack of processing capacity in the serving network node for handling the ICN request, and lack of storage capacity in the serving network node for handling the ICN request, and wherein the determining is performed by an ICN entity in the serving network node.

2. The method as claimed in claim 1, wherein the determining comprises determining a need for handover of two or more communication devices requesting the same content in respective ICN requests and determining that the target network node has the requested content cached, and initiating in response thereto handover of the two or more communication devices to the target network node.

3. The method as claimed in claim 2, wherein the initiating comprises performing a voting process involving at least the serving network node and the target network node, the voting process determining whether or not to hand over communication devices that request the ICN content and reside in a coverage area of the serving network node, to the target network node.

4. The method as claimed in claim 1, further comprising:
performing a voting process involving the serving network node and at least a second network node, both of which provide a requested content to one or more communication devices, and comprising, for the case that the voting process determines that the serving network node is to serve the one or more communication devices, multicasting or broadcasting the requested content to the one or more communication devices.

5. The method as claimed in claim 1, further comprising:
receiving, from the communication device, a measurement report on signal strength from the target network node, the measurement report being received appended to the ICN request.

6. A serving network node for handover of a communication device to a target network node, the serving network node comprising processing circuitry configured to:
determine, based on content of an Information Centric Networking, ICN, request, a need for handover,
initiate, in response to the determining, a handover of the communication device to the target network node,
receive the ICN request from the communication device,
wherein, to determine comprises determining at least one of: (a) a lack of availability in a content storage of content requested in the ICN request; and (b) a lack of resources in the serving network node for providing the content requested in the ICN request,
wherein the determining is performed by an ICN entity in the serving network node, and
performing a voting process involving the serving network node and at least a second network node, both of which provide a requested content to at least one communication device, and comprising, for the case that the voting process determines that the serving network node is to serve the at least one communication device, multicasting or broadcasting the requested content to the at least one communication device.

7. The serving network node as claimed in claim 6, wherein the processing circuitry is further configured to:
determine an indication on lack of resources in an ICN entity for providing the content of the ICN request.

8. The serving network node as claimed in claim 6, wherein the processing circuitry is further configured to:
determine a lack of resources for providing the content requested from a content provider based on metadata of the ICN request.

9. The serving network node as claimed in claim 6, wherein the processing circuitry is further configured to:

determine that the target network node has the requested content cached, and initiating in response thereto handover of the communication devices to the target network node.

10. The serving network node as claimed in claim 9, wherein the processing circuitry is further configured to:
determine a need for handover of two or more communication devices requesting the same content in respective ICN requests and to determine that the target network node has the requested content cached, and configured to initiate, in response thereto, handover of the two or more communication devices to the target network node.

11. The serving network node as claimed in claim 10, wherein the processing circuitry is further configured to:
initiate by performing a voting process involving at least the serving network node and the target network node, the voting process determining whether or not to hand over communication devices that request the ICN content and reside in a coverage area of the serving network node, to the target network node.

12. The serving network node as claimed in claim 6, wherein the need for handover is determined by an ICN entity in the serving network node, and wherein determining the need for handover comprises determining one or both of, an indication on lack of resources in the ICN entity for providing the content of the ICN request and lack of resources in the serving network node for providing the content requested in the ICN request,
wherein the lack of resources comprises at least one of, lack of storage capacity in an ICN entity of the serving network node, lack of resources in a pending interest table (PIT) in an ICN entity of the serving network node, lack of resources in a Forwarding Information Base (FIB) in an ICN entity of the serving network node, lack of processing capacity in the serving network node for handling the ICN request, and lack of storage capacity in the serving network node for handling the ICN request.

13. A method performed by a network entity for determining need for handover of a communication device from a serving network node to a target network node, the method comprising:
establishing that there is a lack of at least one of availability in a content storage of content requested in an Information Centric Networking, ICN, request and resources in an ICN entity of the serving network node for providing the content requested by the communication device in the ICN request,
determining, in response to the establishing, a need for handover of the communication device to the target network node,
determine a need for handover of at least two communication devices requesting the same content in respective ICN requests and to determine that the target network node has the requested content cached, and configured to initiate, in response thereto, handover of the at least two communication devices to the target network node, and
initiate by performing a voting process involving at least the serving network node and the target network node, the voting process determining whether or not to hand over communication devices that request the ICN content and reside in a coverage area of the serving network node, to the target network node.

14. A network entity for determining need for handover of a communication device from a serving network node to a target network node, the network entity comprising processing circuitry configured to:
   establish that there is a lack of resources in an ICN entity of the serving network node for providing the content requested by the communication device in the ICN request, and
   determine, in response to the establishing, a need for handover of the communication device to the target network node,
   wherein the lack of resources comprises at least one of, lack of storage capacity in an ICN entity of the serving network node, lack of resources in a pending interest table (PIT) in an ICN entity of the serving network node, lack of resources in a Forwarding Information Base (FIB) in an ICN entity of the serving network node, lack of processing capacity in the serving network node for handling the ICN request, and lack of storage capacity in the serving network node for handling the ICN request.

15. The network entity as claimed in claim 14, wherein the processing circuitry is further configured to:
   provide, in response to the determining, a handover initiation request to a radio resource management of the serving network node.

16. The network entity as claimed in claim 14, wherein the processing circuitry is further configured to:
   establish by receiving, from the ICN entity of the serving network node, an indication on lack of resources in the ICN entity for providing the content of the ICN request.

17. The network entity as claimed in claim 14, wherein the processing circuitry is further configured to:
   establish by receiving, from an ICN entity of the serving network node, an indication of lack of availability to the content requested by the communication device.

* * * * *